INVENTOR
Eric John Gargini
BY Richard ... Ag't

COLOUR TELEVISION SYSTEMS

Filed Feb. 19, 1964 7 Sheets-Sheet 2

INVENTOR
Eric John Gargini
BY Richard Lund
Ag't

INVENTOR
Eric John Gargini
BY Richard Lord
Ag't

INVENTOR
Eric John Gargini
BY Richard Lord
Agt

INVENTOR
Eric John Gargini
BY
Richard [illegible]
Ag't

Feb. 7, 1967 E. J. GARGINI 3,303,272

COLOUR TELEVISION SYSTEMS

Filed Feb. 19, 1964 7 Sheets-Sheet 6

INVENTOR
Eric John Gargini
BY Richard Lord
ag't

INVENTOR
Eric John Gargini
BY Richard ... Ag't

United States Patent Office 3,303,272
Patented Feb. 7, 1967

3,303,272

COLOUR TELEVISION SYSTEMS

Eric John Gargini, West Drayton, Middlesex, England, assignor to Communications Patents Limited Filed Feb. 19, 1964, Ser. No. 346,013
Claims priority, application Great Britain, Feb. 20, 1963, 6,781/63
14 Claims. (Cl. 178—5.2)

Figure 1:
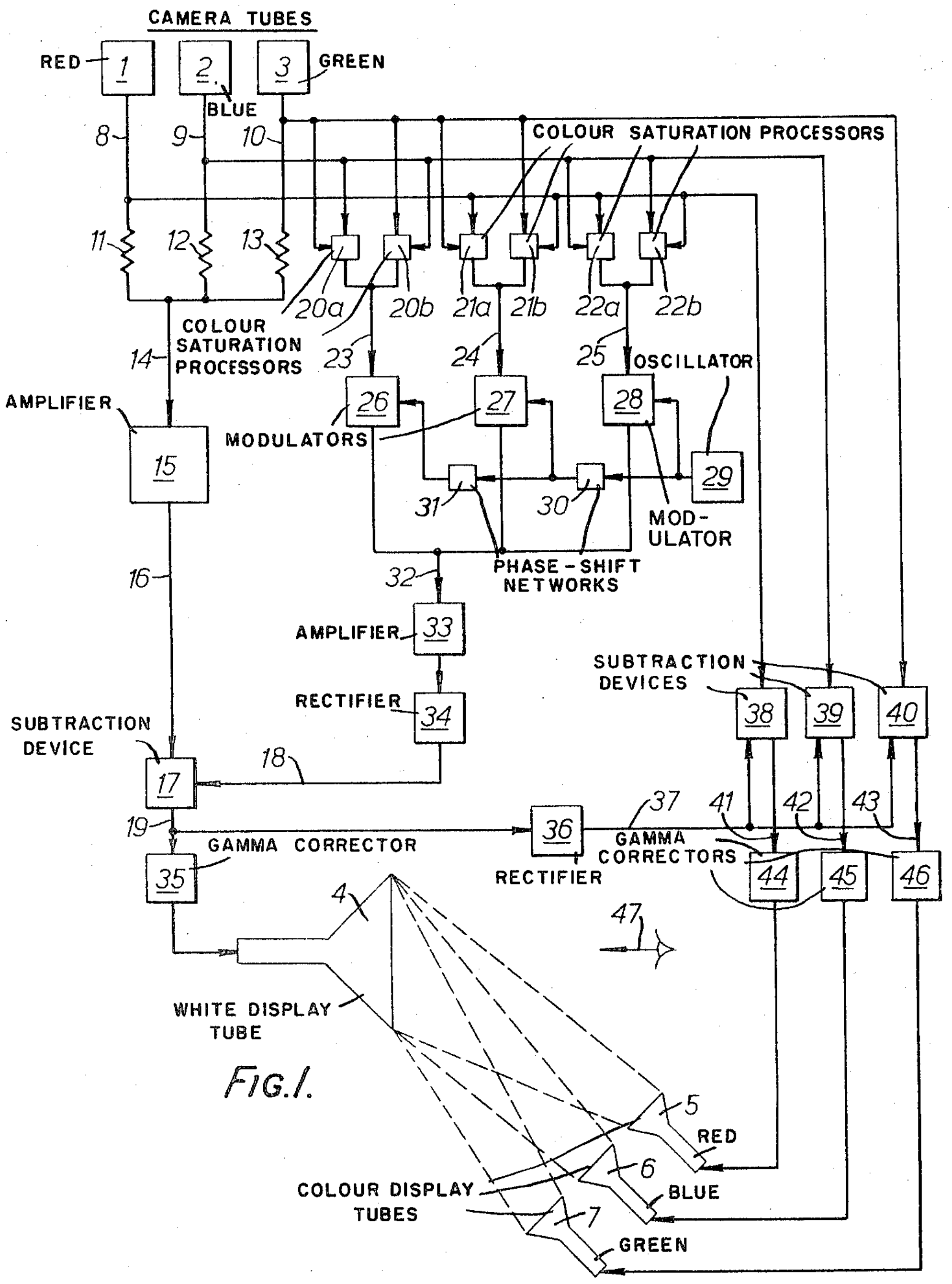

This invention relates to colour television systems and seeks to provide a new form thereof.

The colour television systems which are presently in use or contemplated rely upon the additive mixing of three primary colours, such as red, blue and green to provide white, complementary colours and pastel shades. It is well established in the colour television art that viewers are much more critical of white colour and pastel shade balance and white and pastel detail in a television picture than they are of colour accuracy and detail and this situation means, in practice, that the greatest accuracy in the picture display device is required when all three primary colours are excited, at which time accuracy of colour balance and registration is most difficult to achieve. This is particularly so for white and pastel shades in large areas at different brightness levels.

It is an object of the present invention to avoid the difficulties of white and pastel shade colour balance and registration to which present colour television systems are subject and to do so with relatively simple apparatus.

Various proposals have been made from time to time to improve the colour registration and colour balance in colour television display devices but none have so far proved entirely satisfactory, particularly in apparatus destined for use by normal viewers not skilled in the adjustment of the display apparatus.

We are aware that a colour television system has also been proposed in which a colour television picture is reproduced by projecting onto a detailed black and white reproduction of a televised scene a coarse coloured picture which can contain simultaneously red, blue and green light so that the coloured picture includes non-saturated colours. The black and white reproduction is controlled by the luminance signal of a standard colour television transmission and the colour reproduction by the chrominance signal. When saturated colours are to be reproduced some measure of reduction in the brightness of the black and white reproduction in coarse detailed areas is effected so that dilution of the coloured reproduction by the black and white reproduction is minimised and fine detail luminance information appears in the black and white reproduction.

However, in a colour television system provided by the present invention each elemental coloured area of a colour television image is reproduced by mixing together either a white light primary and one of three saturated coloured light primaries or by mixing together a white light primary and two of three saturated coloured light primaries, the two saturated colours being in a ratio according to the hue of the reproduced colour. The white light content of a scene is transmitted and reproduced in fine detail and the saturated coloured light component in coarse detail. The ratio of the white to coloured light determines the degree of saturation of the colour of the coloured light. No camera analysing primary is possible in respect of white light and the required electric signal, that is the transmission primary white, indicative of the white light content of a televised scene is specially derived from standard colour camera analysing primaries.

In its broadest aspect the invention provides a colour television system wherein low definition saturated colour signals are used in conjunction with a comparatively high definition signal to establish a composite picture the large area white component and finer detail of which is presented by white light, characterised by the fact that said high definition signal is representative of the white content of picture elements.

From a more detailed aspect the invention provides a colour television system in which white light and saturated coloured light are additively mixed to reproduce any colour represented by a colour television signal which includes whiteness detail, the whiteness detail of said signal being reproduced by a whiteness display device adapted to produce white light, but not coloured light, whilst the saturated colour detail of said signal is reproduced by means of a colour display device adapted to produce saturated coloured light, the two display devices being so arranged that a viewer is presented with a composite picture comprised of the two displays superimposed one upon the other.

The invention further provides a colour television transmitting means arranged to generate a whiteness signal representative of whiteness detail in a televised scene, which whiteness signal is arranged to represent zero or a predetermined low degree of whiteness on saturated colours in said scene, and a colouring signal representative of colour detail in said televised scene and which is arranged to represent zero colour or white in said scene.

Yet further the invention provides a colour television receiving means in which at the display device any colour other than white light is composed either of a mixture of white light and a coloured light or a coloured light alone, the coloured light being composed either of a primary colour or of a mixture of two primaries and being arranged to be absent when white light alone is being produced.

According to a modification of the present invention there is provided a colour television system in which rapid changes of information are handled in a wide band channel and relatively slower changes of information are handled in a separate, narrow band channel.

The "white light" referred to throughout this specification is to be understood as meaning light which, in relation to the coloured light, is acceptable to viewers of the composite television picture as white light. To be acceptable the white light does not need to be purely achromatic and may have a slight bias towards a colour. In terms of the C.I.E. Chromaticity Chart white light may be defined as light of that colour which has the co-ordinates $X=0.31$, $Y=0.316$ where the reproducing primary colours are red of co-ordinates $X=0.67$, $Y=0.33$, green of co-ordinates $X=0.21$, $Y=0.71$ and blue of co-ordinates $X=0.14$, $Y=0.08$. A light whose co-ordinates lie between $X=0.31$, $Y=0.316$ and these defining a 10% saturation of any colour will be acceptable to viewers as white and may thus be considered to be a "white light" for the purposes of the present invention.

Figure 2:
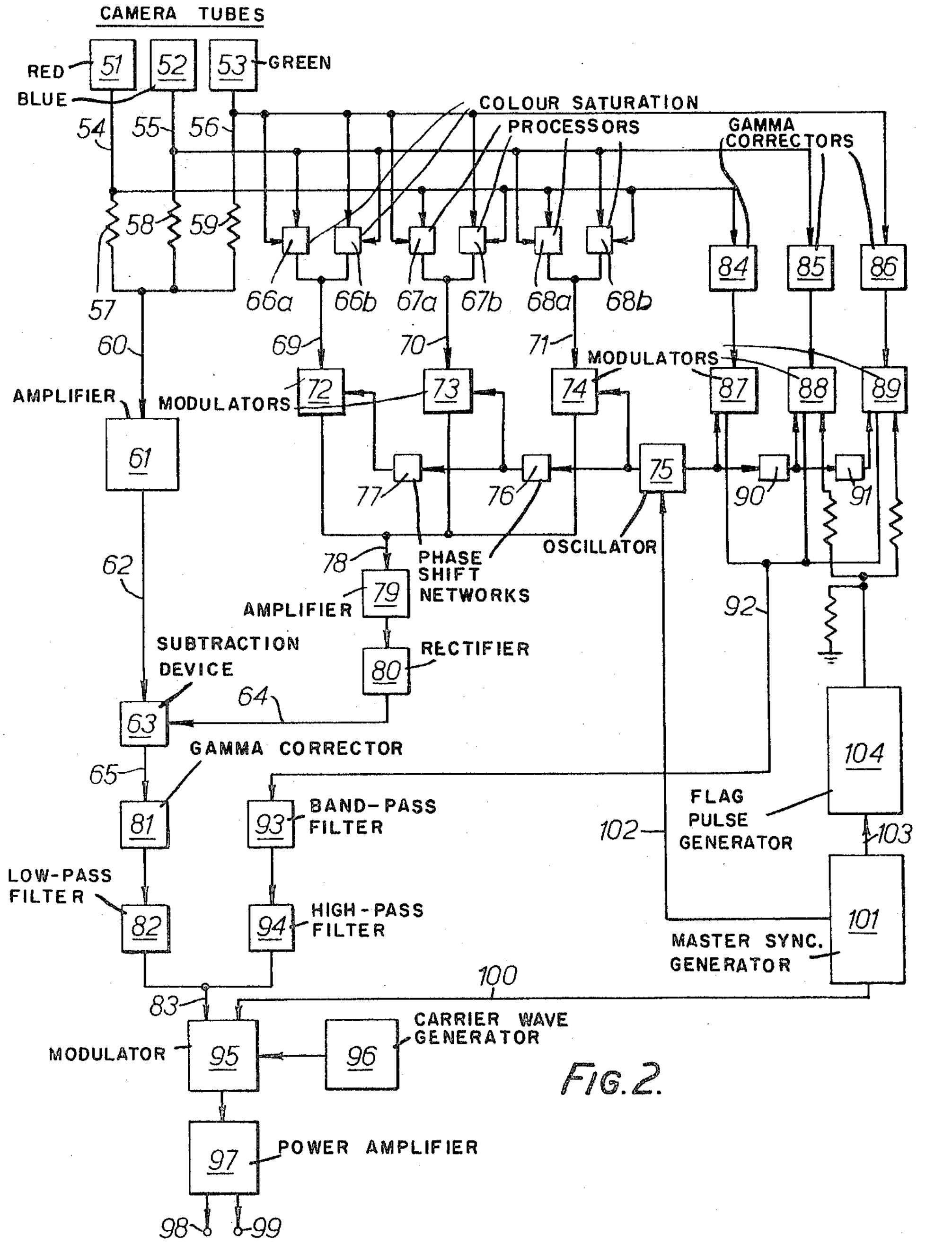
Figure 3:
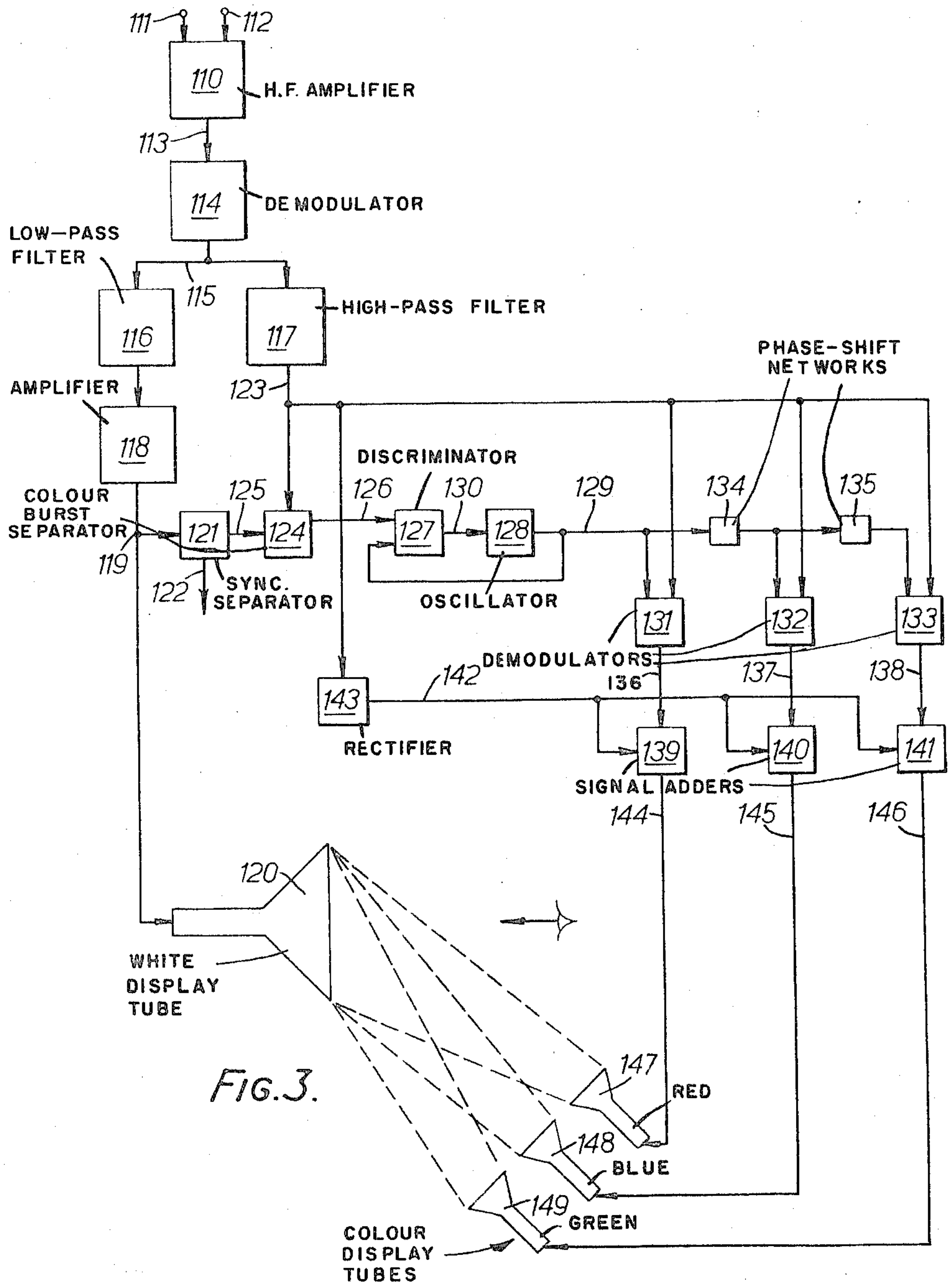
Figure 4:
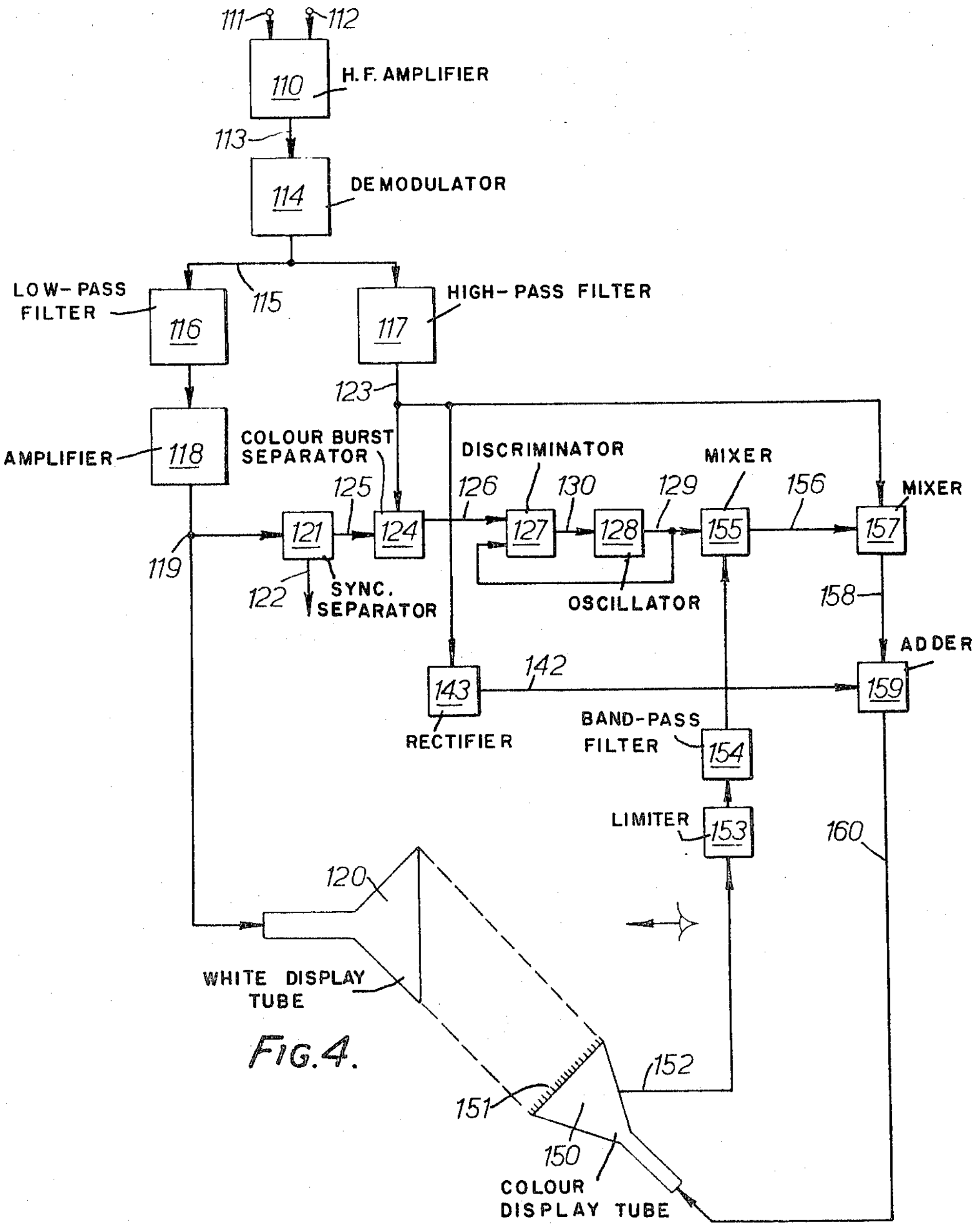
Figure 5:
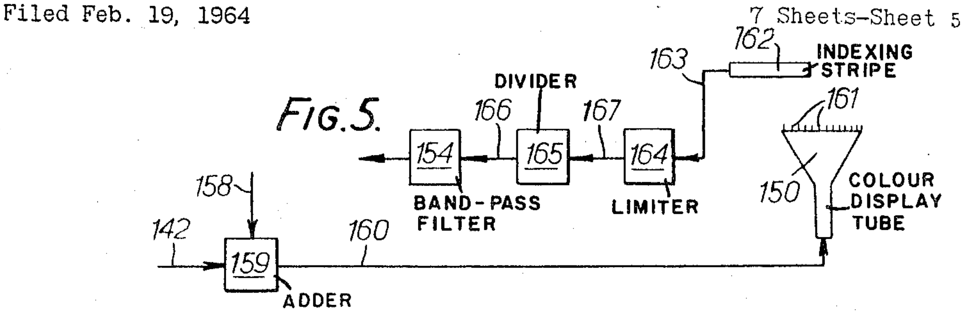
Figures 6, 9:
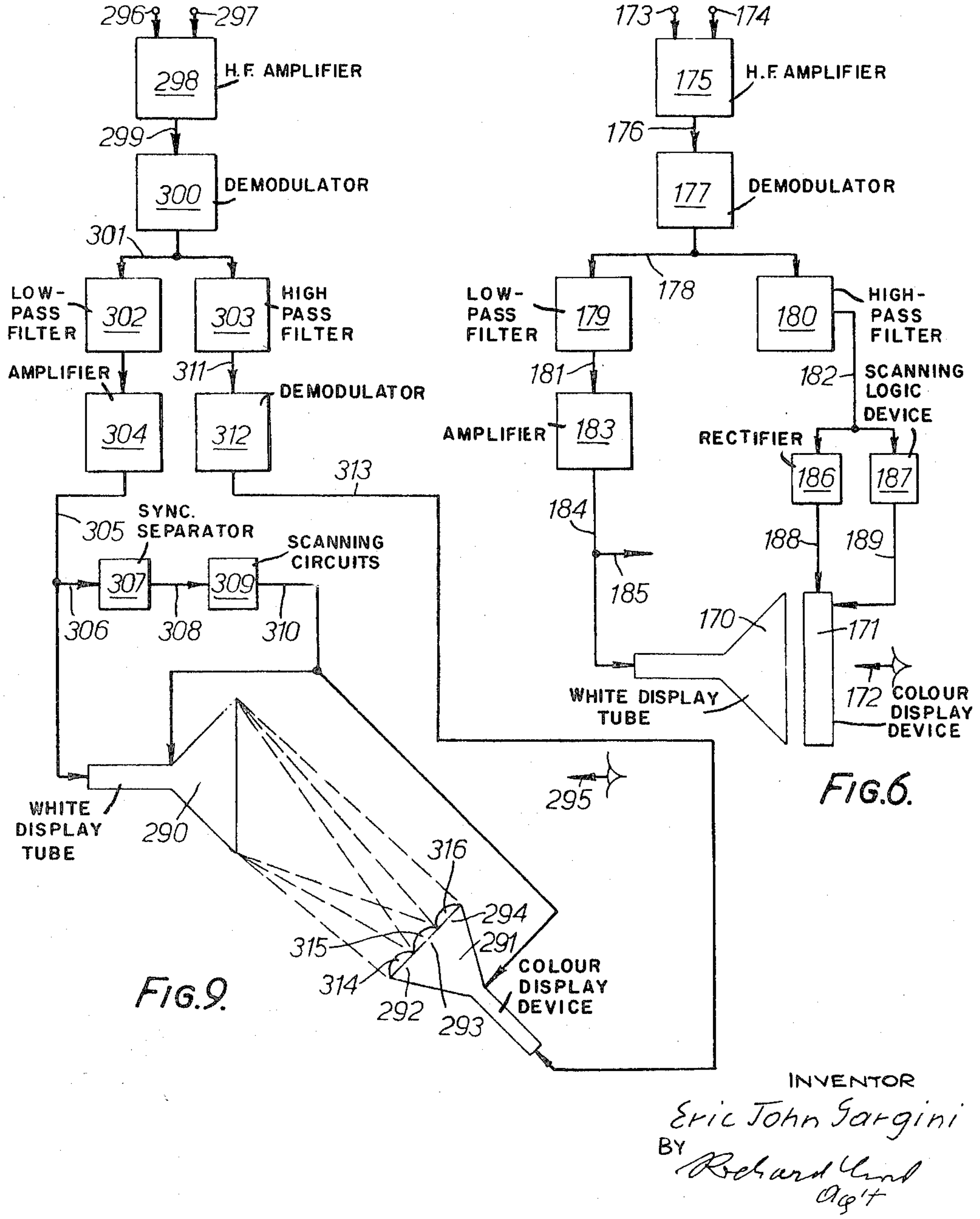
Figure 7:
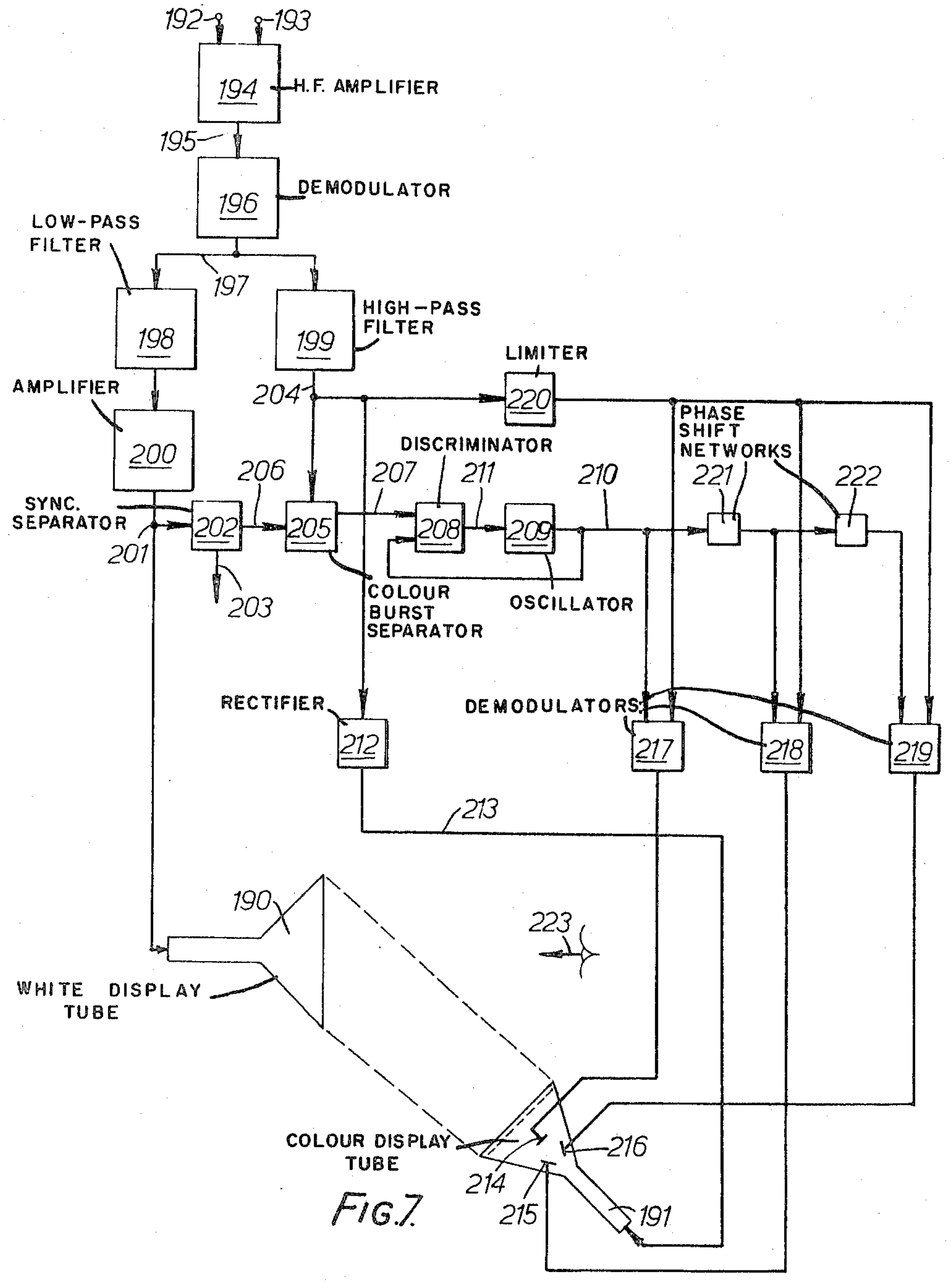
Figure 8:
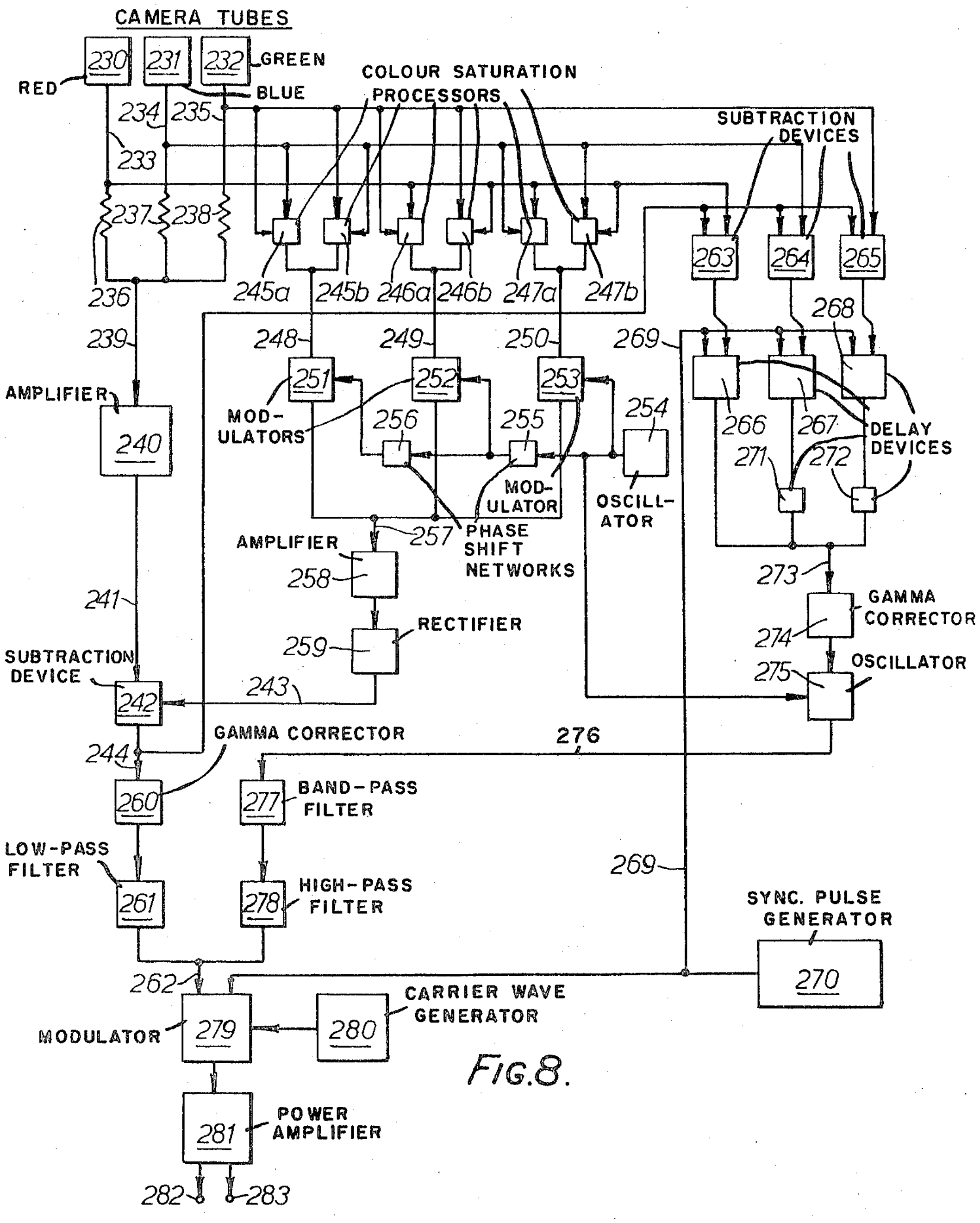

The invention may be carried into effect in various ways and some of these will now be described, by way of example only, with reference to the accompanying drawings in which:

FIG. 1 is a block schematic diagram of a colour television system in accordance with the present invention wherein signal transmission between the transmitting and receiving means is effected directly at video frequencies, FIG. 2 is a block schematic diagram of a transmitting apparatus for a colour television system in accordance with the present invention wherein signal transmission between the transmitting and receiving means is effected by high frequency signals over either a radio or a wired transmission path, FIG. 3 is a block schematic diagram of a receiving apparatus in acocrdance with the present invention for reproducing the signals transmitted by the transmitting means of FIG. 2, FIG. 4 is a block schematic diagram of another form of receiving apparatus in accordance with the present invention, for reproducing the signals transmitted by the transmitting means of FIG. 2, FIG. 5 is a block schematic diagram of part of a first modified form of the receiving apparatus shown in FIG. 4,

FIG. 6 is a block schematic diagram of part of a second modified form of the receiving apparatus shown in FIGS. 3 and 4, FIG. 7 is a block schematic diagram of part of a third modified form of the receiving apparatus shown in FIGS. 3 and 4, FIG. 8 is a block schematic diagram of a further form of colour television transmitting apparatus in accordance with the present invention, and FIG. 9 is a block schematic diagram of receiving apparatus in accordance with the present invention for reproducing the signals transmitted by the transmitting means of FIG. 8.

In the colour television system shown in FIG. 1 three signal producing means 1, 2 and 3 are provided which are responsive to red, blue and green light respectively in the scene to be transmitted. The electric signals produced by these three means are formed into a whiteness signal representative of the degree of whiteness which exists in each element of the scene and colouring signals representative of the degree of each colour in each element of said scene. The whiteness signal is applied directly at video frequencies to a whiteness display means 4 whilst the colouring signals are applied, also directly at video frequencies, to respective colour display means 5, 6 and 7. It will be appreciated that when white areas of the scene are being transmitted only the whiteness signal is present and when saturated colour areas of the scene are being transmitted only the appropriate primary colour signal or pair of primary colour signals is transmitted. Because of the provision of the separate whiteness display means 4 there is no requirement for all three colouring signals to be present simultaneously so that colour matching and registration problems associated with the colour display means 5, 6 and 7 are reduced.

In more detail the three means 1, 2 and 3 may comprise pick-up tubes arranged to provide signals of the form required for red, blue and green reproducing phosphors. The respective output signals appearing on the lines 8, 9 and 10 are arranged to have equal amplitudes when responding to a saturated scene of red, blue or green. The signals appearing on the lines 8, 9 and 10 are combined in equal proportions to form a so called equal energy signal by means of the combining resistors 11, 12 and 13 connected between said lines and an input line 14 of a common amplifier 15. The amplified equal energy signal from said amplifier 15 is present on the line 16. Alternatively the means 1, 2 and 3 may be arranged to provide signals which for a peak white scene, have equal amplitudes. The whiteness signal referred to above is produced from the equal energy signal after subtracting therefrom in the subtraction device 17 a correcting signal which is applied to the device 17 over the line 18 and which is dependent upon the colour saturation of coloured areas of the scene being transmitted. The whiteness signal appears on the line 19. The correcting signal is arranged to have, for a saturated primary and a saturated complimentary colour, an amplitude corresponding to that of the whiteness signal so that for said saturated colour the whiteness signal is completely cancelled at any brightness level.

The correcting signal is derived as follows. The signals representative of the primary colours appearing in the transmitted scene and which are present on the lines 8, 9 and 10 are pased to three pairs of signal processing devices 20*a*, 20*b*; 21*a*, 21*b*; and 22*a*, 22*b*. These devices are arranged to provide on their output lines 23, 24 and 25 respectively signals which on saturated complementary colours have amplitudes corresponding to signals due to a saturated primary colour. Each device may conveniently comprise a gain controlled amplifier, the amplifiers of each pair being associated with two of the three signal lines, 8, 9 and 10. The devices 20*a* and 20*b* are associated with the signal lines 9 and 10 which carry the blue and green colouring signals respectively. The device 20*a* is arranged to receive the blue signal as its input signal and the green signal as its gain controlling signal, while the device 20*b* is arranged to receive the green signal as its input signal and the blue signal as its gain controlling signal. The output line 23 of this pair of devices carries signals representing the saturation or quantity, of the blue/green complimentary colour cyan. The device 21*a* is arranged to receive the red signal as its input signal and the green signal as its gain controlling signal while the device 21*b* is arranged to receive the green signal as its input signal and the red signal as its gain controlling signal. The output line 24 of this pair of devices carries signals representing the saturation of the red/green complementary colour yellow. The device 22*a* is arranged to receive the red signal as its input signal and the blue signal as its gain controlling signal while the device 22*b* is arranged to receive the blue signal as its input signal and the red signal as its gain controlling signal. The output line 25 of this pair of devices carries signals representing the saturation of the red/blue complementary colour magenta. The use of cyan, yellow and magenta signals to form the correcting signal on the line 18 allows the use of simpler apparatus to form the whiteness signal than would be the case if only the red, blue and green signal components were used.

The signals on the output lines 23, 24 and 25 are fed to the modulators 26, 27 and 28 respectively wherein they effect modulation of a high frequency carrier wave signal provided by the oscillator device 29. The three signal components on the lines 23, 24 and 25 are arranged to form phase distinct modulation components of the carrier wave signal from the oscillator device 29 and to this end the oscillations from said oscillator device 29 are fed to each modulator in a different phase. The oscillator is thus connected directly to the modulator 28, through a first phase-shift network 30 to the modulator 27 and through both said first phase-shift network 30 and a second phase-shift network 31 to the modulator 26. Conveniently the phase-shift networks 30 and 31 are similar and each may introduce a phase-shift of 120° to signals passing through it.

The oscillations produced by the oscillator device 29 and modulated by the signals on the lines 23, 24 and 25 appear on the common output line 32 and from thence are passed to an amplifier 33. The amplified signal from this amplifier 33 is then rectified by a rectifier 34 the direct current output signal of which appears on the line 18 by which it is applied to the subtraction device 17, as previously mentioned.

The whiteness signal on the line 19, which is produced by the subtraction from the equal energy signal on the line 16 of the correcting signal on the line 18, is passed through a gamma correcting network 35 and thence to the whiteness display means 4, which may be a so-called monochrome television tube (actually a whiteness tube). The whiteness signal on the line 19 is also fed to a further rectifier device 36 which provides on the line 37, a varying direct current signal dependent upon the amplitude of the whiteness signal.

The direct current signal on the line 37 is applied to three further subtraction devices 38, 39 and 40 which also have applied to them the red, blue and green colour signals respectively which appear on the lines 8, 9 and 10. The resulting signals which are provided by said subtraction devices on the lines 41, 42 and 43 represent the red, blue and green colour signals respectively less any component which is common to all said signals and which thus corresponds to a whiteness component in the scene being transmitted. The signals on the lines 41, 42 and 43 are passed through corresponding individual gamma correcting networks 44, 45 and 46 and thence to the colour display tubes 5, 6 and 7. The coloured portions of the transmitted scene are projected onto the face of the whiteness display tube, the combined picture being viewed from the direction of the arrow 47. An optical system or systems may be included in the light path between the tubes 5, 6 and 7 and the tube 4, if desired, to enable tubes of differing sizes to be employed, to focus the coloured areas on the faces of the tubes 5, 6 and 7 onto the face of the tube 4, and to permit a convenient mechanical arrangement of the various tubes. Such optical system or systems may include lenses, mirrors and dichroic mirrors as required depending upon their configuration and purpose, the object being to present to a viewer a composite colour picture.

FIG. 2 shows a transmitting apparatus for transmitting over a wire or radio signal path colour television signals comprising a whiteness signal component and a colouring signal component.

Broadly the transmitting apparatus comprises means responsive to the primary colour components of a scene to be transmitted and means for modifying said signals to provide a whiteness signal representative of the coloured components in said scene. For a white scene component only the whiteness signal is present, whilst for a saturated colour scene component only the colouring signal is present. The whiteness and colouring signals are arranged to modulate a high frequency carrier wave, together with the appropriate synchronising signals, the final modulated carrier wave being applied either to an aerial or conductors of a wired broadcasting system as desired.

In more detail the transmitting apparatus shown in FIG. 2 comprises three means 51, 52 and 53 which are arranged to provide signals of the form required for red, blue and green reproducing phosphors. These means may conveniently comprise television pick-up tubes which are rendered suitably responsive to the coloured light, for example by means of colour filters associated with them. Alternatively these means may comprise sources of signals of the form required for red, blue and green reproducing phosphors, said signals being received from a receiving apparatus arranged to receive broadcast colour television signals of a regular colour television broadcast transmitter. The electric signals produced by the three means 51, 52 and 53 appearing on the lines 54, 55 and 56 respectively are arranged to have equal amplitudes when responding to a saturated scene of red, blue or green. These electric signals are combined in equal proportions to form a so-called equal energy signal. The combination of said signals is affected by the combining resistors 57, 58 and 59, the combined signal appearing on the common line 60. The equal energy signal on the line 60 is fed to an amplifier 61, the amplified signal from which is passed over the line 62 to a subtraction device 63 to which a correcting signal is also applied over the line 64. The generation of this correcting signal will be described later. Alternatively the means 51, 52 and 53 may be arranged to provide signals which on a peak white scene have equal amplitudes. The output signal from the subtraction device 63 which appears on the line 65 is the whiteness signal.

The correcting signal is arranged to have, for a saturated primary or complementary colour, an amplitude corresponding to that of the whiteness signal so that for said saturated colour the whiteness signal is completely cancelled. The correcting signal is formed from the signals on the lines 54, 55 and 56 in a manner similar to that described in connection with FIG. 1 by means of three pairs of gain controlled amplifiers 66*a*, 66*b*; 67*a*, 67*b*; 68*a*, 68*b*. Each pair of these amplifiers has a corresponding output line 69, 70 and 71 the signals on which, for saturated complementary colours, have amplitudes corresponding to signals due to a saturated primary colour. The signals on the output lines 69, 70 and 71 are fed to corresponding modulators 72, 73 and 74 wherein they effect modulation of a high frequency carrier wave signal provided by the oscillator device 75. The three signal components on the lines 69, 70 and 71 are arranged to form phase distinct modulation components of the carrier wave signal from the oscillator device 75 and to this end the carrier wave signal is fed to each modulator in a different phase. The oscillator is thus connected directly to the modulator 74, through a first phase-shift network 76 to the modulator 73 and through said phase-shift network 76 and a second phase-shift network 77 to the modulator 72. Conveniently the phase-shift networks 76 and 77 are similar and each may introduce a phase-shift of 120° to signals passing through it.

The output signals of the modulators 72, 73 and 74 appear on the common output line 78 and are applied to the amplifier 79, the amplified signal from which is rectified by the rectifier 80 the direct current output signal of which appears on the line 64 as the correcting signal mentioned previously.

The whiteness signal on the line 65 which is produced by the subtraction from the equal energy signal on the line 62 of the correcting signal on the line 64 is passed through a gamma correcting network 81 to a low pass filter 82 which in the case of transmission on the 625-line standard may be arranged to have a cut-off frequency of about 5 mc./s. The whiteness signals which pass through the filter 82 appear on the input line 83 of the transmitter modulator 95. In addition to the whiteness signal the colouring signal is also fed to this line 83.

The colouring signal is formed by passing the signals on the lines 54, 55 and 56 through corresponding gamma correcting networks 84, 85 and 86, the gamma-corrected signals then being applied to corresponding modulators 87, 88 and 89 therein to modulate a carrier wave signal derived from the oscillator device 75. In order to enable the three colouring signal components to be resolved by the receiving equipment each is arranged to modulate said carrier wave signal in a distinctive phase. This is achieved by the inclusion of phase-shift networks 90, 91 between the oscillator 75 and the modulators 88 and 89. Conveniently each phase-shift network introduces a phase-shift of 120° in the signal passing through it, the carrier wave applied to the modulator 88 thus being shifted 120° in phase relative to that applied to the modulator 87 whilst the carrier wave applied to the modulator 89 is shifted 240° in phase having passed through both networks 90 and 91. The frequency of the carrier wave produced by the oscillator 75 may be about 6 mc./s., or lower with suitable modifications to the filters 93 and 94. In the latter case the colouring signal may overlap the whiteness channel and be frequency interleaved therwith as in the N.T.S.C. colour television system.

The modulated output signals from the modulators 87, 88 and 89 appear on their common output line 92 and are fed through a band pass filter 93, arranged, in the case of a 6 mc./s. carrier wave from the oscillator 75, to pass signals in the range 5–7 mc./s., approximately. The filter 93 thus limits the bandwidth of the colouring signal to a value which gives satisfactory colour resolution at the receiver having regard to the frequency spectrum occupied by the transmitted signal. From the band pass filter 93 the colouring signal passes through a high pass filter 94 which has a cut-off frequency of about 5 mc./s. and thence to the input line 83 of the transmitter modulator 95. The filters 82 and 94 act as a diplexer for applying both the whiteness and colouring signals to the line 83.

The transmitter modulator 95 receives a carrier wave signal from the carrier wave generator 96 which provides a high frequency alternating current signal at the frequency which is to be transmitted. The modulated carrier wave signal from the modulator 95 is amplified by a power amplifier 97 and appears between two output terminals 98, 99 to which may be connected either an aerial for effecting transmission of the television of the television signal over a radio path or conductors of a wired broadcasting system.

The modulator 95 is provided with an additional input line 100 over which synchronising signals, derived from a master synchronising generator 101, are fed to effect modulation of the carrier wave signal from the oscillator 96. Synchronising signals from the generator 101 are also passed over a line 102 to control the frequency of the oscillations produced by the oscillator 75 so that the colour sub-carrier may, if desired, be frequency interleaved with the whiteness signal. In addition, further signals from the generator 101 are fed over a line 103 to a flag pluse generator 104, the pulses produced by which define, to a receiver receiving the transmitted television signal, a reference colour and are applied to the colouring signal modulators 88 and 89.

FIG. 3 shows a receiving apparatus for reproducing colour television signals transmitted by the transmitting apparatus shown in FIG. 2. Broadly the receiving apparatus comprises means for amplifying and demodulating the received high frequency signal, separating the whiteness and colouring signals and a whiteness display means responsive to the whiteness signal and colour display means responsive to the colouring signal. The whiteness and colour display means are so arranged that the images provided thereby appear to a viewer superimposed one upon the other to form a single television picture in full colour.

In more detail the apparatus comprises a high frequency amplifier 110 having a pair of input terminals, 111 and 112, to which may be connected an aerial or the conductors of a wired broadcasting system depending upon the transmission medium employed to convey the television signals between the transmitter and receiver. The amplified high frequency signals are then applied over the line 113 to a demodulator 114 which provides on its output line 115 the whiteness and colouring signals. As these two signals have to be separated to effect proper control of the whiteness and colour display means respectively the line 115 is connected to two filter networks 116 and 117.

The filter 116 is a low pass filter having a cut-off frequency of about 5 mc./s. and allows the whiteness signal to pass to an amplifier 118 the amplified output from which is passed over a line 119 to a whiteness display means in the form of a cathode ray tube 120. Signals on the line 119 are also passed to a snychronising signal separator 121 which separates from the whiteness signal the synchronising pulses which are present in it. The separated synchronising pulses are passed to the scanning circuits, (not shown) of the receiving apparatus over the line 122.

The filter 117 is a high pass filter having a cut-off frequency of about 5 mc./s. and allows the colouring signal to pass onto the line 123. The line 123 feeds several units of the receiving equipment. The first is a colour burst separator 124 which receives also a gating signal from the synchronising pulse separator 121 over the line 125 and provides on its output line 126 the separated colour bursts which comprise bursts of alternating current at the colour subcarrier frequency. These colour bursts are applied to a discriminator 127 together with oscillations produced by a subcarrier re-insertion oscillator 128 and which are present on the line 129. The discriminator 127 compares the frequency and phase of the colour bursts on the line 126 with the frequency and phase of the alternating current on the line 129 and feeds a correcting signal to the oscillator 128 over the line 130 with the object of maintaining the frequency and phase of the alternating current produced by the oscillator 128 in correspondence with the frequency and phase of the colour bursts.

The alternating current on the line 129 is also applied to three demodulators 131, 132 and 133 each of which demodulates a respective positive colour component and negative component due to either of the other two components of the colouring signal. As these components are present on the colour subcarrier in phase distinct manner each component may be recovered by ensuring the appropriate phase relationship between the colouring signal and reinsertion carrier as applied to the demodulators 131, 132 and 133. To this end the alternating current on the line 129 is applied directly to the demodulator 131, through a phase-shift network 134 to the demodulator 132 and to the demodulator 133 through both the phase-shift network 134 and a second, similar network 135. Both phase-shift networks 134 and 135 may introduce phase-shifts of 120°.

Due to the phase relationships between the colouring components the demodulated signals present on the output lines 136, 137 and 138 of the demodulators 131, 132 and 133 respectively contain unwanted negative signal components in respect of colouring components other than the one desired on any particular line. In order to nullify the effect of these unwanted components the signals on the lines 136, 137 and 138 are fed to signal adding devices 139, 140 and 141 respectively where they are added to a colour saturation signal which contains a direct current component from the line 142 which is provided by a rectifier 143 from the colouring signals present on the line 123. The red, blue and green colouring signals appear on the output lines 144, 145 and 146 respectively of the three signal adding devices and are each applied to a corresponding colour display means 147, 148 and 149, each of which may comprise a cathode ray tube respectively arranged to produce red, blue and green light.

Instead of the three colour display means 147, 148 and 149 each for producing one of three colours red, blue and green the receiving apparatus may be modified to utilize a single colour display means capable of producing any one of these three colours or a combination of two of these colours. There is no requirement to produce the three colours simultaneously since this corresponds to white which is provided by a separate display device. Such a modified receiving apparatus is shown in Fig. 4.

In this figure those parts which are the same as those employed in the apparatus of FIG. 3 are given the same reference numerals.

The single colour display means 150 is formed by a cathode ray tube which has on its face a plurality of colour stripe triplets, each triplet being separated by an indexing stripe, indicated diagrammatically at 151, which provides a secondary emission signal on the output line 152 each time it is crossed by the electron beam. The secondary emission signals on the line 152 have, in the case of a colour television system operating on 625-line standard and a colour definition of 1 mc./s. a frequency of about 2–3 mc./s. and define to the receiving apparatus the position of the electron beam across the face of the tube 150. The indexing signals on the line 152 are passed to a limiter 153, through a band pass filter 154, the purpose of which is to remove unwanted signal components from the indexing signal, and thence to a mixer device 155 where it is mixed with the subcarrier re-insertion signal on the line 129. The sum frequency output, between about 6.4 and 7.4 mc./s., is taken from the mixer 155 and applied over the line 156 to a further mixer 157. In the latter the signal on the line 156 is mixed with the colouring signal present on the line 123 and the difference frequency component, in the range 2–3 mc./s., derived therefrom is made available on line 158. The signal on this line 158 is then applied to a signal adding device 159 where it is added to the direct current colour saturation signal on the line 142 to provide on the line 160 the correct common colouring signal for application to the tube 150.

A modification of the receiving apparatus of FIG. 4 is shown in FIG. 5. In this modified arrangement a different method of indexing the position of the scanning electron beam is used in that, instead of employing a stripe of secondary emission inducing material between each colour triplet, there is employed between each colour stripe an indexing stripe 161 of a material capable of giving off light outside the visible spectrum when excited by the electron beam. Each third indexing stripe 161 has a greater width than the others so as to provide a distinctive signal when excited by said electron beam. The light emitted by the stripes 161 is detected by a light sensitive cell 162 which produces an electric output signal on the line 163 each time a stripe is excited by the electron beam, such signal having a predominant component at one third the indexing frequency due to said wider stripes. Since there are three times as many stripes in the arrangement of FIG. 5 than in that of FIG. 4 the signals on the line 163 are applied, after passing through the limiter device 164 to a dividing device 165 which is arranged to produce on its output line 166 a signal at one third the indexing frequency in response to the higher frequency indexing signals applied to it by way of its input line 167, the predominant component due to the wider stripes ensuring that the signal on the line 166 is securely phase-related to the signals on the line 167. The signal on the line 166 is then similar to that delivered from the limiter 153 in FIG. 4 and is likewise passed to the band pass filter 154 for further utilisation as described in connection with that figure.

FIG. 6 shows yet another form of receiving apparatus for displaying colour television pictures in response to signals transmitted by the transmitting apparatus shown in FIG. 2. The whiteness signal is displayed on a whiteness display means 170 in the form of a monochrome cathode ray tube whilst the colouring signal is displayed by a flat display means 171, such for example as a modified so-called Willis tube or Gabor tube, or an obliquely scanned flat tube of otherwise conventional construction, having transparent colour phosphors so that the whiteness display is visible through it when viewed from the direction of the arrow 172.

Colour television signals for the receiving apparatus shown in FIG. 6 are arranged to be received either from an aerial or conductors of a wired broadcasting network between the terminals 173, 174. Signals applied between said terminals are amplified by a high frequency amplifier 175 the amplified signals from which are applied over the line 176 to a demodulator 177 which provides on its output line 178 the whiteness and colouring signals. The whiteness and colouring signals are separated by low and high pass filters 179, 180 respectively, the whiteness signal appearing on the line 181 and the colouring signal appearing on the line 182. The whiteness signal on the line 181 is then amplified by an amplifier 183 and applied to the whiteness display means 170 over the line 184, a branch 185 of which also applies the whiteness signal, which includes the synchronising signals, to the synchronising signal separator and scanning circuits, not shown. The colouring signals on the line 182 are applied both to a rectifier 186 and a scanning logic device 187. The rectifier 186 provides on its output line 188 a direct current signal representative of the intensity of the colour component of the scene being reproduced at any particular time and is applied to control the electron beam current of the colour display means 171. The scanning logic device 187 produces, from the colouring signal, control signals which are applied over the line 189 to the colour display means 171 and determines the position and colour of the picture element to be reproduced at any instant.

FIG. 7 shows yet another receiving apparatus suitable for receiving colour television transmissions transmitted by the transmitting apparatus shown in FIG 2. The whiteness display means 190 in this arrangement comprises a monochrome cathode ray tube whilst the colour display means 191 comprises a single gun phosphor dot colour cathode ray tube. The receiving apparatus is arranged to receive colour television signals from an aerial or the conductors of a wired broadcasting system connected between the input terminals 192, 193 of a high frequency amplifier 194. The amplified signals on the line 195 are applied to a demodulator 196 which provides on its output line 197 the whiteness and colouring signals. As these two signals have to be separated to effect proper control of the whiteness and colour display means the line 197 is connected to two filter networks 198, 199. The filter 198 is a low pass filter having a cut-off frequency of about 5 mc./s. and allows the whiteness signal to pass to a further amplifier 200, the amplified output from which is passed over a line 201 to the whiteness display means 190. Signals on the line 201 are also passed to a synchronising signal separator 202 which separates from the whiteness signal the synchronising pulses which are present in it. The separated synchronising pulses are passed to the scanning circuits (not shown) of the receiving apparatus over the line 203. The filter 199 is a high pass filter having a cut-off frequency of about 5 mc./s. and allows the colouring signal to pass onto the line 204 which feeds several units of the receiving equipment. The first is a colour burst separator 205 which receives also a gating signal from the synchronising pulse separator 202 over the line 206 and provides on its output line 207 the separated colour bursts which comprise bursts of alternating current at the colour subcarrier frequency. The colour bursts are applied to a discriminator 208 together with oscillations produced by a subcarrier re-insertion oscillator 209 and which are present on the line 210. The discriminator 208 compares the frequency and phase of the colour bursts on the line 207 with the frequency and phase of the alternating current on the line 210 and feeds a correcting signal to the oscillator 209 over the line 211 with the object of maintaining the frequency and phase of the alternating current produced by the oscillator 209 in correspondence with the frequency and phase of the colour bursts.

The colouring signal on the line 204 is also fed to a rectifier 212 which provides on its output line 213 a colour saturation signal which contains a direct current component and which is applied to a control electrode of the colour display means 191 to control the intensity of the colour reproduced. The colour which is reproduced is determined by an additional deflection of the electron beam effected by three electrostatic deflection plates 214, 215 and 216. If desired this additional deflection could be effected electromagnetically, but when the main scanning deflection is electromagnetic this is possibly less convenient than the electrostatic arrangement shown. The signals applied to the electrostatic deflection plates 214, 215 and 216 are derived from corresponding demodulation devices 217, 218 and 219 each of which is fed with the colouring signal from the line 204 after it has been amplitude limited by the limiter device 220. Because the separate components of the colouring signal are phase-distinct the re-insertion carrier from the oscillator 209 is fed to each demodulator in a different phase. Thus the demodulator 217 is connected directly to the oscillator 209 by way of the line 210 whilst the demodulator 218 is connected to said oscillator through the phase-shift network 221. The demodulator 219 is connected to the oscillator 209 through both the phase-shift network 221 and an additional phase-shift network 222. Both the phase-shift networks 221 and 222 introduce the same phase-shift of 120° in signals passing through them. The images produced by the two display means 190 and 191 are arranged to be visible from the direction of the arrov 223 as a single, composite colour television picture.

In another example of the present invention the red, blue and green components of the colouring signal are transmitted in sequence during each line interval. A transmitting apparatus suitable for such a system is shown in FIG. 8 and comprises three means 230, 231 and 232 which are arranged to provide signals of the form required for red, blue and green reproducing phosphors respectively. These means conveniently can comprise television pick-up tubes which are rendered suitably responsive to the coloured light, for example by means of colour filters associated with them. The electric signals produced by these three means appear on the lines 233, 234 and 235 respectively and are arranged to have equal amplitudes when responding to a saturated scene of red, blue or green. These electric signals are combined in equal proportions to form a so-called equal energy signal. The combination of said signals is effected by the combining resistors 236, 237 and 238, the combined signal appearing on the common line 239 as the equal energy signal, and this is fed to an amplifier 240, the amplified signal from which is passed over the line 241 to a subtraction device 242 to which a correcting signal is also applied over the line 243. The generation of this correcting signal will be described later. Alternatively the means 230, 231 and 232 may be arranged to provide signals which on a peak white scene have equal amplitudes.

The output signal from the subtraction device 242 which appears on the line 244 is the whiteness signal.

The correcting signal is arranged to have, for a saturated primary or complementary colour, an amplitude corresponding to that of the whiteness signal so that for said saturated colour the whitness signal is completely cancelled. The correcting signal is formed from the signals on the lines 233, 234 and 235 in a manner similar to that described in connection with FIG. 1 by means of three pairs of gain controlled amplifiers 245*a*, 235*b*; 246 *a*, 246*b*; 247*a*, 247*b*. Each pair of these amplifiers has a corresponding output line 248, 249 and 250 the signals on which, for saturated complementary colours, have amplitudes corresponding to signals due to a saturated primary colour. The signals on the output lines 248, 249 and 250 are fed to corresponding modulators 251, 252 and 253 wherein they effect modulation of a high frequency carrier wave signal provided by the oscillator device 254. The three signal components on the lines 248, 249 and 250 are arranged to form phase distinct modulation components of the carrier wave signal from the oscillator device 254 and to this end the carrier wave signal is fed to each modulator in a different phase. The oscillator is thus connected directly to the modulator 253, through a first phase-shift network 255 to the modulator 252 and through said first phase-shift network 255 and a second phase-shift network 256 to the modulator 251. Conveniently the phase-shift networks 255 and 256 are similar and each may introduce a phase-shift of 120° to signals passing through it.

The output signals of the modulators 251, 252 and 253 appear on the common output line 257 and are supplied to the amplifier 258, the amplified signal from which is rectified by the rectifier 259 to form the direct current output signal mentioned previously.

The whiteness signal on the line 244 which is produced by the subtraction from the equal energy signal on the line 241 of the correcting signal on the line 243 is passed through a gamma correcting network 260 to a low-pass filter which in the case of transmission on the 625-line standard may be arranged to have a cut-off frequency of about 5 mc./s. The whiteness signals which pass through the filter 261 appear on the input line 262 of the transmitter modulator. In addition to the whiteness signal the colouring signal is also fed to this line 262.

The colouring signal is formed by passing the signals on the lines 233, 234 and 235 to corresponding subtraction devices 263, 264 and 265 where they are subtracted from the whiteness signal on the line 244. The resulting output signals from said subtraction devices are passed to corresponding swept delay devices 266, 267 and 268 which are effective in the case of transmission on the 625-line standard to introduce delays of up to 40$\mu$s. The actual delay introduced by these devices is controlled by a controll signal on the line 269 which is provided by the master synchronising pulse generator 270. The control signal on the line 269 is effective progressively to reduce the delay introduced by said delay devices from their maximum value of about 40$\mu$s. to a very low value which is, for practical purposes zero. In this way the colouring information of each picture line is compressed from about 60$\mu$s. duration to about 20$\mu$s. duration so that the compressed information in respect of the three colour signals can be transmitted in sequence during the time taken to scan one picture line, that is about 60$\mu$s. This sequential transmission is effected by combining the three output signals from the delay devices 266, 267 and 268, the output signal from the delay device 267 being passed through a further delay device 271 which introduces a delay about 20$\mu$s. to signals passing through it and output signal from the delay device 268 being passed through a second further delay device 272 which introduces a delay of about 40$\mu$s. to signals passing through it. The sequentially combined signals which thus appear on the line 273 are then passed through a gamma correcting network 274 to a modulator device 275 in which they effect modulation of the carrier wave signal provided by the oscillator device 254. The modulated carrier wave signal from the modulator device 275 appears on the line 276 and is passed through a band pass filter 277, arranged, in the case of a 6 mc./s. carrier wave from the oscillator 254, to pass signals in the range 5–7 mc./s. approximately. The filter 277 thus limits the bandwidth of the colouring signal to a value which gives satisfactory colour resolution at the receiver having regard to the frequency spectrum occupied by the transmitted signal. From the band pass filter 277 the colouring signal passes through a high pass filter 278 which has a cut-off frequency of about 5 mc./s. and thence to the input line 262 of the transmitter modulator. The filters 261 and 278 act as a diplexer for applying both the whiteness and colouring signals to the line 262.

If desired, the oscillator 254 may be arranged to produce oscillations having a frequency lower than 6 mc./s. and the filters 277 and 278 suitably modified, in which case the colouring signal may overlap the whiteness channel and be frequency interleaved therewith as in the N.T.S.C. color television system.

The transmitter modulator 279 receives a carrier wave signal from the carrier wave generator 280 which provides a high frequency alternating current signal on the frequency which is to be transmitted. The modulated carrier wave signal from the modulater 279 is amplified by a power amplifier 281 and appears between two output terminals, 282 and 283, to which may be connected either an aerial for effecting transmission of the television signal over a radio path or conductors of a wired broadcasting system.

The modulator 279 is provided with an additional input line 284 over which synchronising signals derived from the master synchronising generator 270 are fed to effect modulation of the carrier wave signal from the oscillator 280 in addition to the whiteness and colouring signals on the line 262. Synchronising signals from the generator 270 are also passed over the line 285 to control the frequency of the oscillations produced by the oscillator 254 so that the colour subcarrier may, if desired, be frequency interleaved with the whiteness signal.

A receiving apparatus suitable for receiving colour television transmissions from the transmitting apparatus shown in FIG. 8 is shown in FIG. 9.

In this arrangement the whiteness display means 290 comprises a monochrome cathode ray tube whilst the colour display means 291 comprises a cathode ray tube having on its face three areas 292, 293 and 294 each arranged to produce light of a corresponding one of the colours red, blue and green. The display means 291 may be a cathode ray tube provided with three areas of phosphor, each arranged to fluoresce with the appropriate colour when excited by the electron beam. Alternatively the display means may comprise a monochrome cathode ray tube having on its face colour-filters whereby the white light produced by its phosphor appears to a viewer as being of the appropriate colour when the superimposed images produced by the whiteness and colour display means are viewed in the direction of the arrow 295.

The receiving apparatus is arranged to receive colour television signals from an aerial or the conductors of a wired broadcasting system between the input terminals, 296 and 297, of a high frequency amplifier 298. The amplified signals on its output line 299 are applied to a demodulator 300 which provides on its output line 301 the whiteness and colouring signals. The whiteness and colouring signals have to be separated to effect proper control of the whiteness and colour display means and this separation is effected by the filter networks 302 and 303.

The filter 302 is a low pass filter having a cut-off frequency of about 5 mc./s. and allows the whiteness signal to pass to a further amplifier 304, the amplified output from which is passed over the line 305 to the whiteness display means 290. From the line 305 a branch line 306 passes the whiteness signal also to a synchronising signal separator 307 which separates from the whiteness signal the synchronising pulses which are present in it. The separated synchronising pulses are passed over the line 308 to the scanning circuits 309 the output signals from which are applied over the line 310 to the display means 290 and 291 to effect scanning of their electron beams.

The filter 303 is a high pass filter having a cut-off frequency of about 5 mc./s. and allows the colouring signal to pass onto the line 311 which feeds a demodulator 312. This demodulator 312 provides on its output line 313 a direct current signal which is applied to the colour display means 291 to control the brightness of the coloured images produced thereby. The separate red, blue and green images produced on the areas 292, 293 and 294 are projected in superimposed relationship onto the image produced by the whiteness display means 290 by means of the lenses 314, 315 and 316, respectively.

In the foregoing examples of the invention fine detail which occurs in areas of fully saturated colour in the televised scene are not transmitted. This is not really troublesome in practice since during normal colour television transmissions 100% saturated colours occur only rarely if at all. However, such 100% saturated colours may be approached and possibly achieved during the transmission of colour cartoon films. Although the eye is insensitive to changes directly between one saturated coloured area and another when they are of the same intensity level, it is sensitive both to changes of intensity which occur within an area of saturated colour and to differences between two areas of different saturated colours if their intensity levels are different. The examples of the invention hereinbefore described can be modified so that they will convey to the receiving apparatus the said two changes to which the eye is sensitive. Broadly, this modification results in a colour television system in which rapid changes of information are handled in a wide band channel (the whiteness channel) and relatively slower changes of information are handled in a separate, narrow band channel (the colour channel). This modified system is self-adaptive in that rapid information changes in respect of colours tending towards saturation, are automatically conveyed by the whiteness channel.

In this modified system the subtraction device in which the whiteness signal is formed is arranged to operate in such a manner that the subtraction of the correcting signal from the equal energy signal is incomplete on saturated colours so that at those times the resulting whiteness signal has a finite amplitude. This manner of operation may be achieved simply by appropriate adjustment of the amplitude of the equal energy signal relative to the correcting signal or conversely.

At the receiver the whiteness signal now no longer falls to zero amplitude on saturated colours so that the whiteness display device will produce white light when it should be extinguished. However, this situation can be corrected by adjusting the brightness control of the whiteness display so that it does not produce white light until it exceeds the new amplitude which it has on saturated colours.

The signals pertaining to the fine detail present in the saturated colour areas of the scene are now present in the wide band whiteness channel below the black signal level. These fine detail signals are transferred to the colour display device or devices through a limiting means such as a diode. The limiting means is arranged to permit signal amplitude variations in the whiteness channel which occur below black level to affect the intensity of the colour display device or devices while amplitude variations in the whiteness channel above the black level are prevented from affecting the intensity of the colour display device or devices.

Although the colour display device or devices can display only coarse detail in the sense that colour hue changes are limited by the number of colour dots or stripes present in the device it is still capable of displaying fine details of intensity of the limited number of hues as is required to display any fine detail present in an area of saturated colour.

As an alternative to this modified system the colour signal amplitude prior to the formation of the whiteness signal, can be first divided by a narrow band equal energy signal and then multiplied by a medium band equal energy signal. As a further alternative, the colour signal amplitude may first be divided by a narrow band equal energy signal and then multiplied by a medium band equal energy signal. This second alternative will result in the colour signal having narrow band angle changes for conveying coarse hue information and medium amplitude changes in respect of fine intensity detail information which occurs during saturated colours.

If desired the transmitting appartus shown in FIG. 2 may be modified to enable a simplification to be effected in receiving apparatus of the types shown in FIGS. 6 and 7 by omitting the rectifier devices 186 and 212 respectively. The modification to the transmitting appartus consists firstly in omitting the gamma correcting devices 84, 85 and 86 and then passing the colouring signal present on the common output line 92 to a limiter device to produce a signal having a substantially constant amplitude and a phase which is indicative of the colour to be reproduced at the receiver. This limited signal is then amplitude modulated in a modulator device by the correcting signal on the line 64, said correcting signal being passed through a gamma correcting network prior to its application to said modulator device. The resulting phase and amplitude modulated signal is then applied to the band pass filter 93 for transmission as the colouring signal. In this modified arrangement the flag pulse from the flag pulse generator 104 must still be applied to the modulators 88 and 89 to provide a reference phase and additionally must be applied to the modulator device which has been added to provide a reference amplitude as well, the reference phase and amplitude serving to define to the receiving apparatus a reference colour and brightness.

A further modification which may be made in the various receiving arrangements described above is that the whiteness and colour display means may be combined in a single unit similar, for example, to the R.C.A. two gun type cathode ray tube, the electron stream from one gun being employed to reproduce the whiteness component and that from the other being employed to reproduce the colouring signal.

If the colour display means described herein are arranged to provide colours which have equal subjective brightness the brightness striping effect present when employing usual colour stripe tubes may be avoided. Additionally the system will then operate at "constant luminance" to hue changes when noise is present in the colour channel.

The colour television systems which have been described herein are so-called compatible systems in that in each case its signals may be satisfactorily received on a monochrome receiver which reproduces television signals only in black and white. Although in these systems the whiteness signal is absent at times there is, at those times, a colouring signal present which is reproduce on a monochrome receivers as a grey dot-pattern which appears to the viewer not greatly different in grey tone from that which would be caused by a similarly coloured scene area when transmitted by a monochrome television system.

What I claim is:

1. In a colour television system wherein a low definition signal in respect of color is used in conjunction with a comparatively high definition signal in respect of detail to establish a composite display depicting a televised scene, the provision of a colour television picture signal source for providing high definition colour signals in respect of each of a plurality of analyzing primary colours, combining means for combining said colour signals to form an equal energy signal, correcting signal generating means responsive to said colour signals for generating a correcting signal which for a saturated primary and a saturated complementary colour has an amplitude corresponding to that of said equal energy signal, and signal subtracting means for subtracting said correcting signal from the equal energy signal to form a high definition signal which is representative of the white light content of said televised scene.

2. In a colour television system wherein a low definition signal in respect of colour is used in conjunction with a comparatively high definition signal in respect of detail to establish a composite display depicting a televised scene, the provision of a colour television picture signal source for producing high definition colour signals of the form required for red, blue and green reproducing phosphors, the colour signal, when representing a colour content of the televised scene which is a saturated red, having the same amplitude as the colour signal when representing a saturated blue, and the same amplitude as the colour signal when representing a saturated green, combining means for combining said colour signals to form an equal energy signal, correcting signal generating means responsive to said colour signals to generate a correcting signal which for a saturated primary and a saturated complementary colour has an amplitude corresponding to that of said equal energy signal, and signal subtracting means for subtracting said correcting signal from the equal energy signal to form a high definition signal which is representative of the white light content of said televised scene.

3. In a colour television system wherein a low definition signal in respect of colour is used in conjunction with a comparatively high definition signal in respect of detail to establish a composite display depicting a televised scene, the provision of a colour television picture signal source for producing high definition colour signals of the form required for red, blue and green reproducing phosphors, the colour signal, when representing a colour content of the televised scene which is a saturated red, having the same amplitude as the colour signal when representing a saturated blue, and the same amplitude as the colour signal when representing a saturated green, combining means serving to combine said colour signals to form an equal energy signal, correcting signal generating means for generating a correcting signal which for a saturated primary and a saturated complementary colour has an amplitude corresponding to that of said equal energy signal and including three pairs of signal processing devices having respective output terminals and arranged to provide at the output terminals of each pair a correction signal which for saturated complementary colours has an amplitude corresponding to the signal which pertains to a saturated primary colour, and signal subtracting means for subtracting the generated correcting signal from the equal energy signal to form a high definition signal which is representative of the white light content of said televised scene.

4. A colour television system comprising colour display means for producing coloured light in response to a low definition colouring signal which is representative of colour content of a televised scene, a whiteness display means for producing white light without coloured light in response to a high definition whiteness signal which is representative of the white content of elements of the scene, means for presenting a composite display from said whiteness display means and said colour display means in which the reproduction of the white light and the coloured light are additively mixed to depict the televised scene, and a colour television picture signal source for providing colour signals in respect of each of a plurality of analyzing primary colours, combining means for combining said colour signals to form an equal energy signal, correcting signal generating means responsive to said colour signals for generating a correcting signal which for a saturated primary and a saturated complementary colour has an amplitude corresponding to that of said equal energy signal, and signal subtracting means for subtracting said correcting signal from the equal energy signal to form said high definition whiteness signal.

5. A colour television system comprising colour display means for producing coloured light in response to a low definition colouring signal which is representative of colour content of a televised scene, a whiteness display means for producing white light without coloured light in response to a high definition whiteness signal which is representative of the white content of elements of the scene, means for presenting a composite display from said whiteness display means and said colour display means in which the reproduction of the white light and the coloured light are additively mixed to depict the televised scene, a colour television picture signal source for producing high definition colour signals of the form required for red, blue and green reproducing phosphors, the colour signal, when representing a colour content of the televised scene which is a saturated red, having the same amplitude as the colour signal when representing a saturated blue, and the same amplitude as the colour signal when representing a saturated green, combining means for combining said colour signals to form an equal energy signal, correcting signal which has for a saturated primary and a saturated complementary colour an amplitude corresponding to that of said equal energy signal generating means responsive to said colour signals to generate a correcting signal, and signal subtracting means for subtracting said correcting signal from the equal energy signal to form said high definition whiteness signal.

6. A colour television system comprising colour display means for producing coloured light in response to a low definition, colouring signal which is representative of colour content of a televised scene, a whiteness display means for producing white light without coloured light in response to a high definition whiteness signal which is representative of the white content of elements of the scene, means for presenting a composite display from said whiteness display means and said colour display means in which the reproduction of the white light and the coloured light are additively mixed to depict the televised scene, a colour television picture signal source for producing high definition colour signals of the form required for red, blue and green reproducing phosphors, the colour signal, when representing a colour content of the televised scene which is a saturated red, having the same amplitude as the colour signal when representing a saturated blue, and the same amplitude as the colour signal when representing a saturated green, combining means for combining said colour signals to form an equal energy signal, correcting signal generating means for generating a correcting signal which has for a saturated primary and a saturated complementary colour an amplitude corresponding to that of said equal energy signal and including three pairs of signal processing devices having respective output terminals and arranged to provide at the output terminals of each pair a correcting signal which for saturated complementary colours has an amplitude corresponding to the colour signal which pertains to a saturated primary colour, and signal subtracting means for subtracting the generated correcting signal from the equal energy signal to form said high definition whiteness signal which is representative of the white light content of said televised scene.

7. A colour television system comprising colour display means for producing coloured light in response to a low definition colouring signal which is representative of colour content of a televised scene, a whiteness display means for producing white light without coloured light in response to a high definition whiteness signal which is representative of the white content of elements of the scene, means for presenting a composite display from said whiteness display means and said colour display means in which the reproduction of the white light and the coloured light are additively mixed to depict the televised scene, a wide band signal channel for handling rapid changes of scene information, a narrow band signal channel for handling relatively slower changes of scene information, a colour television picture signal source for providing primary signals in respect of each of a plurality of analyzing primary colours, the primary signal, when representing a colour content of the televised scene which is a saturated red, having the same amplitude as the colour signal when representing a saturated blue, and the same amplitude as the colour signal when representing a saturated green, signal processing means for forming from said primary signals a low definition colouring signal for transmission over said narrow band signal channel to said colour display means, combining means for combining said primary signals to form an equal energy signal, correcting signal generating means responsive to said primary signals for producing a correcting signal which has for a saturated primary and a saturated complementary colour an amplitude corresponding to that of said equal energy signal, signal subtracting means for subtracting said correcting signal from the equal energy signal to form said high definition whiteness signal which is representative of the white light content of the televised scene, said correcting signal when having said predetermined amplitude being effective to reduce the amplitude of said high definition signal substantially to zero at any brightness level of the televised scene, and auxiliary correcting means for establishing that the correcting signal has, for a saturated primary colour and a saturated complementary colour, an amplitude which differs from said predetermined amplitude, whereby for saturated colour there is obtained for transmission over said wide band channel an auxiliary signal which is representative of rapid intensity charges of saturated colors, and means operative to apply said auxiliary signal as an intensity control signal to the color display means.

8. In a colour television transmitting apparatus, in combination, a colour television picture signal source for providing primary signals in respect of each of a plurality of analyzing primary colours, first signal processing means responsive to said primary signals for producing a whiteness signal representative of the white content of elements of said television picture, and second signal processing means responsive to said primary signals for producing a colouring signal representative of the colour content of elements of said television picture, said first signal processing means including combining means for combining said primary signals to form an equal energy signal, and correcting signal generating means including a pair of gain controlled amplifier means in respect to each of said analyzing primary colours, each amplifier means of said pair amplifying a signal in respect of one primary colour and employing a signal in respect of another primary colour as a gain controlling signal, each pair of amplifier means having terminals and being effective to produce at said terminals a correcting signal which for saturated complementary colours has an amplitude which pertains to a saturated primary colour, and signal subtracting means for subtracting the generated correcting signal from the equal energy signal to form the whiteness signal.

9. In a colour television transmitting apparatus, a colour television picture signal source for providing primary signals in respect of each of a plurality of analyzing primary colours, first signal processing means responsive to said primary signals for producing a whiteness signal representative of the white content of elements of said television picture, and second signal processing means responsive to said primary signals for producing a colouring signal representative of the colour content of elements of said television picture, said first signal processing means including combining means for combining said primary signals to form an equal energy signal, correcting signal generating means responsive to said primary signals for generating a correcting signal, and signal subtracting means for subtracting said correcting signal from said equal energy signal thereby to form the whiteness signal.

10. In a colour television system wherein a low definition signal in respect of color is used in conjunction with a comparatively high definition signal in respect of detail to establish a composite display depicting a televised scene, the provision of a colour television picture signal source for producing high definition colour signals of the form required for red, blue and green reproducing phosphors, the colour signal, when representing a colour content of the televised scene which is a saturated red having the same amplitude as the colour signal when representing a saturated blue, and the same amplitude as the colour signal when representing a saturated green, combining means for combining said colour signals to form an equal energy signal, correcting signal generating means for generating a correcting signal which has for a saturated primary and a saturated complementary colour an amplitude corresponding to that of said equal energy signal, said correcting signal generating means including three pairs of gain controlled amplifier means for amplifying a colour signal in respect of one primary colour while employing a colour signal in respect of another primary colour as a gain controlling signal, each pair of amplifier means having terminals and being effective to produce at said terminals an output signal which for saturated complementary colours has an amplitude corresponding to the colour signal which pertains to a saturated primary colour, modulator means for providing a high frequency carrier wave having phase distinct modulation components one in respect of each of the output signals at the output terminals of said three pairs of amplifiers, rectifier means for rectifying said high frequency carrier wave to provide a wave form which includes a direct current component, said rectified modulated carrier wave constituting said correcting signal, and signal subtracting means for subtracting said correcting signal from the equal energy signal to form a high definition whiteness signal which is representative of the white light content of said televised scene, said correcting signal having an amplitude corresponding to that of said equal energy signal being effective to reduce the amplitude of said whiteness signal substantially to zero at any brightness level of the televised scene.

11. A colour television system comprising colour display means for producing coloured light in response to a low definition colouring signal which is representative of colour content of a televised scene, a whiteness display means for producing white light without coloured light in response to a high definition whiteness signal which is representative of the white content of elements of the scene, means for presenting a composite display from said whiteness display means and said coloured display means in which the reproduction of the white light and the coloured light are additively mixed to depict the televised scene, a colour television picture signal source for producing high definition colour signals of the form required for red, blue and green reproducing phosphors, the colour signal when representing a colour content of the televised scene which is a saturated red, having the same amplitude as the colour signal when representing a saturated blue, and the same amplitude as the colour signal when representing a saturated green, combining means for combining said colour signals to form an equal energy signal, correcting signal generating means for generating a correcting signal which has for a saturated primary and a saturated complementary colour an amplitude corresponding to that of said equal energy signal, said correcting signal generating means including three pairs of gain controlled amplifier means for amplifying a colour signal in respect of one primary colour while employing a colour signal in respect of another primary colour as a gain controlling signal, each pair of amplifier means having terminals and being effective to produce at said terminals an output signal which for saturated complementary colours has an amplitude corresponding to the colour signal which pertains to a saturated primary colour, modulator means for providing a high frequency carrier wave having phase distinct modulation components one in respect of each of the output signals at the output terminals of said three pairs of amplifiers, rectifier means for rectifying said high frequency carrier wave to provide a wave form which includes a direct current component, said rectified modulated carrier wave constituting said correcting signal, and signal subtracting means for subtracting said correcting signal from the equal energy signal to form a high definition whiteness signal which is representative of the white light content of said televised scene, said correcting signal having an amplitude corresponding to that of said equal energy signal being effective to reduce the amplitude of said whiteness signal substantially to zero at any brightness level of the televised scene.

12. A colour television system comprising colour display means for producing coloured light in response to a low definition colouring signal which is representative of colour content of a televised scene, a whiteness display means for producing white light without coloured light in response to a high definition whiteness signal which is representative of the white content of elements of the scene, means for presenting a composite display from said whiteness display means and said colour display means in which the reproduction of the white light and the coloured light are additively mixed to depict the televised scene, a wide band signal channel for handling rapid changes of scene information, a narrow band signal channel for handling relatively slower changes of scene information, a colour television picture signal source for producing high definition primary signals of the form required for red, blue and green reproducing phosphors, the amplitude of said primary signals, when representing a colour content of the televised scene which is a saturated red, being the same as the amplitude of said primary signals when representing a colour content of the televised scene which is a saturated blue, and the same as the amplitude of said primary signals when representing a colour content of the televised scene which is a saturated green, signal processing means for forming from said primary signals a low definition colouring signal for transmission over said narrow band signal channel to said colour display means, combining means for combining said primary signals to form an equal energy signal, correcting signal generating means including three pairs of gain controlled amplifier means for amplifying a primary signal in respect of one primary colour while employing a primary signal in respect of another primary colour as a gain controlling signal, each pair of amplifier means having terminals and being effective to produce at said terminals an output signal which for saturated complementary colours has an amplitude corresponding to the primary signal which pertains to a saturated primary colour, modulator means for providing a high frequency carrier wave having phase distinct modulation components one in respect of each of the output signals at the output terminals of said three pairs of amplifiers, rectifier means for rectifying said high frequency carrier wave to provide a wave form which includes a direct current component, said rectified modulated carrier wave constituting a correcting signal which has, for a saturated primary colour and a saturated complementary colour, an amplitude of a predetermined order, signal subtracting means for subtracting said correcting signal from the equal energy signal to form said high definition whiteness signal which is representative of the white light content of the televised scene, said correcting signal when having said predetermined amplitude being effective to reduce the amplitude of said high definition whiteness signal substantially to zero at any brightness level of the televised scene, and auxiliary correcting means for establishing that said correcting signal has, for a saturated primary colour and a saturated complementary colour, an amplitudewhich differs from said predetermined amplitude, whereby for saturated colour there is obtained for transmission over said wide band channel an auxiliary signal which is representative of rapid intensity changes of saturated colours, and means operative to apply said auxiliary signal as an intensity control signal to the colour display means.

13. A colour television system as claimed in claim 12, wherein said means operative to apply said auxiliary signal as an intensity control signal to the colour display means includes circuit means defining a signal path, a gate device in said signal path, and control means responsive to said auxiliary signal for rendering said gate device inoperative when said auxiliary signal is present whereby said auxiliary signal passes to said colour display means, and for rendering said gate device operative when said auxiliary signal is absent, whereby said signal path is blocked.

14. A colour television transmitting appartus comprising a colour television picture signal source for providing primary signals in respect of each of a plurality of analyzing primary colours, a first signal processing means comprising combining means for combining said primary signals to form an equal energy signal, correcting signal generating means for generating a correcting signal which has, for a saturated primary and a saturated complemenary colour, an amplitude corresponding to that of said equal energy signal, said connecting signal generating means including a pair of gain controlled amplifier means in respect of each of said analyzing primary colours, each amplifier means of said pair amplifying a primary signal in respect of one primary colour and employing a primary signal in respect of another primary colour as a gain controlling signal, each pair of amplifier means having terminals and being effective to produce at said terminal an output signal which for saturated complementary colours has an amplitude corresponding to the primary signal which pertains to a saturated primary colour, modulator means for providing a high frequency carrier wave having phase distinct modulation components one in respect of each of the output signals at the output terminals of said three pairs of amplifier means, rectifier means for rectifying said high frequency carrier wave to provide a wave form which includes a direct current component, said rectified carrier wave constituting a correcting signal which has for a saturated primary colour and a saturated complementary colour an amplitude of a predetermined order, signal subtracting means for subtracting said correcting signal from said equal energy signal to form a whiteness signal which is representative of the white light content of the colour television picture, and second signal processing means responsive to said primary signals for producing a colouring signal representative of the colour content of elements of said colour television picture.

References Cited by the Examiner

UNITED STATES PATENTS

| | | | |
|---|---|---|---|
| 2,684,995 | 7/1954 | Schroeder | 178—5.4 |
| 2,842,609 | 7/1958 | Gretener | 178—5.4 |
| 2,848,528 | 8/1958 | Woll | 178—5.4 |
| 2,947,805 | 8/1960 | Moe et al. | 178—5.2 |

DAVID G. REDINBAUGH, *Primary Examiner.*

J. A. O'BRIEN, *Assistant Examiner.*